United States Patent
Iwamoto

Patent Number: 5,950,525
Date of Patent: Sep. 14, 1999

[54] CONTINUOUS PRODUCTION METHOD OF FROZEN BEAN CURD, AND THE APPARATUS THEREOF

[76] Inventor: Hiroaki Iwamoto, 318-5, Inaricho, Tanabe 646, Wakayama-ken, Japan

[21] Appl. No.: 09/110,265

[22] Filed: Jul. 6, 1998

Related U.S. Application Data

[62] Division of application No. 08/929,097, Sep. 15, 1997.

[30] Foreign Application Priority Data

Jan. 17, 1997 [JP] Japan ................................. 9-006357

[51] Int. Cl.⁶ .............................. A23C 3/02; A23J 1/00; A23L 1/20
[52] U.S. Cl. ................................. 99/452; 99/483; 99/453
[58] Field of Search ............................ 99/452, 453, 483; 426/634

[56] References Cited

U.S. PATENT DOCUMENTS

| | | | |
|---|---|---|---|
| 4,947,742 | 8/1990 | Nishibayashi | 99/453 X |
| 5,363,753 | 11/1994 | Ueda et al. | 99/453 |
| 5,863,579 | 1/1999 | Muzzarelli | 99/453 |

FOREIGN PATENT DOCUMENTS

| | | |
|---|---|---|
| 3-147759 | 6/1991 | Japan . |
| 7-48988 | 5/1995 | Japan . |

*Primary Examiner*—Reginald L. Alexander
*Attorney, Agent, or Firm*—Oblon, Spivak, McClelland, Maier & Neustadt, P.C.

[57] ABSTRACT

An object of the present invention is to provide a continuous production method of bean curd, and an apparatus thereof, capable of utilizing heat of the soybean milk efficiently, dramatically reducing the production time, and minimize the amount of the thickener and the solidifying agent. In the present invention of a continuous production method of frozen bean curd where a thickener and a solidifying agent are added to soybean milk, matured and solidified to make bean curd, and frozen, the soybean milk is conveyed continuously in a fluid state, with the thickener and the solidifying agent continuously injected thereto, and putted in a maturing section successively for maturing and solidification. A continuous production apparatus of frozen bean curd of the present invention has a transportation line for continuously conveying the soybean milk from a soybean milk tank, a thickener injecting section attached to the transportation line, a solidifying agent injecting section attached to the transportation line, and a maturing section arranged at the trailing end of the transportation line, for continuously maturing and solidifying the soybean milk from the transportation line.

6 Claims, 2 Drawing Sheets

CONTINUOUS PRODUCTION METHOD OF FROZEN BEAN CURD, AND THE APPARATUS THEREOF

This application is a Division of application Ser. No. 08/929,097, filed on Sep. 15, 1997.

BACKGROUND OF THE INVENTION

1. Field of the Invention

The present invention relates to a production method of bean curd, and an apparatus thereof.

2. Description of the Related Art

Nowadays bean curd capable of being stored in a frozen state (hereinafter referred to as "frozen bean curd") is known.

Production of the above-mentioned frozen bean curd is conducted in a batch processing method, that is, producing soybean milk in an ordinary method, accommodating the soybean milk in a container of a certain capacity, cooling, mixing with a thickener, and mixing with a solidifying agent. Then the mixture is heated to a certain temperature for maturing and solidification, and frozen as described in Japanese Unexamined Patent Publication No. 5-316984. Examples of the above-mentioned thickeners include starch and gelatin. Examples of the above-mentioned solidifying agents include calcium sulfate.

Since the thickeners have a function of reducing the ratio of free water in the water content of the bean curd so as to increase the internal viscosity of the bean curd, separation and expansion of the water content generated at the time of freezing can be reduced, and thus the internal structure of the bean curd can be preferably maintained at the time of thawing.

The soybean milk needs to be cooled down to about 30° C. when mixed with the thickener or the solidifying agent. This is because a high temperature of the soybean milk causes an excessively large viscosity of the thickener so that homogeneous mixing of the solidifying agent becomes extremely difficult, which may result in uneven quality of the bean curd.

In the above-mentioned conventional production method, the soybean milk, which has a high temperature of about 70 to 95° C. immediately after the production thereof, should be cooled down to about 30° C. for mixing with a thickener or a solidifying agent, and be heated to about 70 to 95° C. again for the subsequent maturing and solidification, and thus it is extremely unreasonable in terms of heat utilization. Besides, since the conventional method is a batch processing method, it involves a problem of requiring a long production time. Furthermore, since mixing and stirring are conducted at a low temperature area, it involves another problem of the tendency of requiring a large amount of a thickener and a solidifying agent.

Accordingly, an object of the present invention is to provide a continuous production method of bean curd, and an apparatus thereof, capable of utilizing heat of the soybean milk reasonably, dramatically reducing the production time, and minimize the amount of the thickener and the solidifying agent.

SUMMARY OF THE INVENTION

In order to achieve the above-mentioned object, in a continuous production method of bean curd according to the present invention, processes of producing bean curd (before freezing) from soybean milk are conducted continuously. In an apparatus for continuously producing the bean curd according to this invention is so constructed that the soybean milk is continuously supplied from a tank to a maturing section via a thickener injecting section and a solidifying agent injecting section.

These and other objects, features and advantages of the present invention will become more apparent upon reading of the following detailed description and accompanying drawings.

DESCRIPTION OF THE PREFERRED EMBODIMENTS

Figure 1:
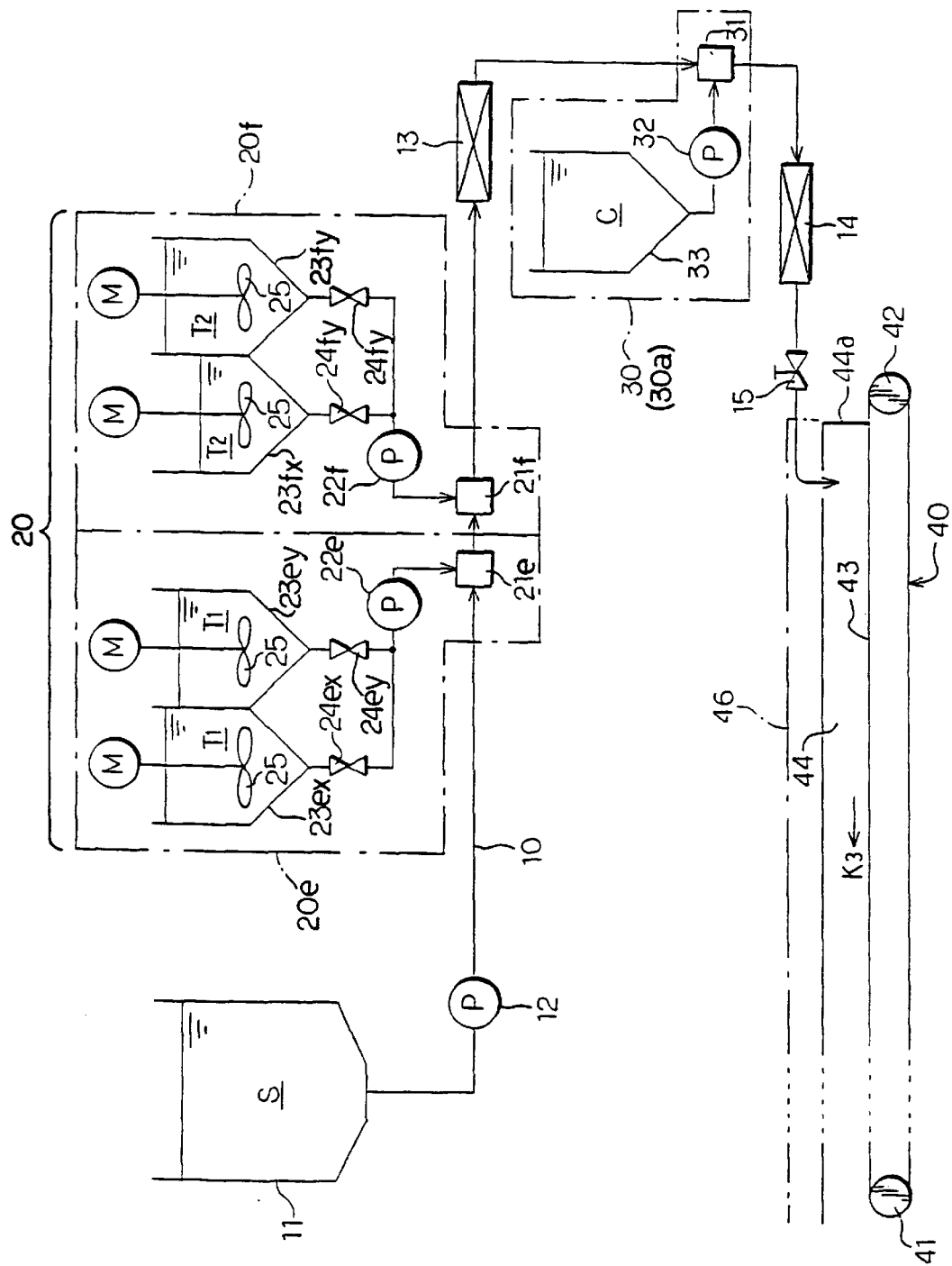
FIG. 1 is a system diagram of the entire configuration of an embodiment of a continuous production apparatus of bean curd of the present invention.

In the present invention of a continuous production method of frozen bean curd where a thickener and a solidifying agent are added to soybean milk, matured and solidified to make bean curd, and frozen, the soybean milk is conveyed continuously in a fluid state, with the thickener and the solidifying agent continuously injected thereto, and putted in a maturing section successively for maturing and solidification.

The temperature of soybean milk when it is supplied from the container is about 70 to 95° C., however, since the time between injecting the thickener and putting into the maturing section is such a short duration as about a few seconds to 20 seconds or less, or about 1 minute at most, effect of the viscosity rise of the thickener can be suppressed to a negligible degree. That is, since a remarkable viscosity rise is not observed until a few minutes from injecting a thickener even with soybean milk of a high temperature, the above-mentioned conventional adverse effect can be prevented.

Therefore, in the present invention, the time between injecting the thickener and putting into the maturing section is preferably 1 minutes or less, more preferably 20 seconds or less.

Preferable examples of a thickener include starch, gelatin, and plant gum. They can be used alone or in combination of two or more. In injecting the thickener to soybean milk, it is preferable to prepare a solution of 30 to 50% concentration by dissolving starch in warm water of about 60° C. or more, or dissolving gelatin in warm water of about 50° C. or more, and inject 10 to 15% by weight of the solution with respect to the soybean milk.

Preferable examples of a solidifying agent include calcium sulfate and bittern. It is preferable to prepare an aqueous solution of about 10% concentration of a solidifying agent and inject about 0.3% by weight of the aqueous solution with respect to the soybean milk.

Accordingly, the amount of a thickener and a solidifying agent is about half compared with the conventional batch processing method.

In the present invention, it is also preferable to inject the solidifying agent after injecting the thickener to soybean milk.

It is further preferable to have the soybean milk pass through a stirring section after injecting the thickener, and after injecting the solidifying agent, respectively, since it helps the soybean milk to homogeneously mix with the thickener and the solidifying agent.

A continuous production apparatus of frozen bean curd of the present invention where a thickener and a solidifying agent are added to soybean milk, matured and solidified to make bean curd, and frozen, comprises a transportation line for continuously conveying the soybean milk from a soybean milk tank, a thickener injecting section attached to the transportation line, a solidifying agent injecting section attached to the transportation line, and a maturing section arranged at the trailing end of the transportation line, for continuously maturing and solidifying the soybean milk from the transportation line.

The transportation line continuously conveys the soybean milk from the soybean milk tank, with the thickener injected by the thickener injecting section, and the solidifying agent injected by the solidifying agent injecting section to supply the soybean milk to the maturing section for continuous maturing and solidification. Bean curd (before freezing) is continuously produced as mentioned above. Here it is preferable to convey the soybean milk to the maturing section in the transportation line in such a short duration as about 1 minute at most, preferably about a few seconds or 20 seconds or less after mixing with the thickener.

It is more preferable in the present invention that the transportation line includes a pipeline and the maturing section includes a conveyor.

It is further preferable in the present invention that a stirring section is provided respectively in the pipeline at the downstream side of the thickener injecting section and at the downstream side of the solidifying agent injecting section, respectively, since the configuration allows homogeneously mixing the soybean milk with the thickener and the solidifying agent.

In the present invention, it is preferable that the thickener injecting section comprises one or plurality of thickener injecting units, and the thickener injecting units comprise a thickener tank, a pump and an inflow nozzle mechanism for the transportation line.

In the case two or more thickener injecting units are provided, plural kinds of thickeners can be injected to the soybean milk by accommodating thickeners of different kinds in each unit.

In the present invention, it is more preferable that the thickener injecting unit comprises a plurality of switchable thickener tanks for supplying the same thickener.

Since a plurality of the switchable thickener tanks are provided as mentioned above, a thickener solution for refill can be prepared in a standby tank so that a desired amount of a thickener can be provided continuously without interrupting the continuous conveyance of the soybean milk.

Furthermore, in the present invention, it is preferable that a stirring mixer is installed in the thickener tank of the thickener injecting section.

By stirring the thickener solution in the thickener tank with the above-mentioned stirring mixer, the viscosity of the thickener solution can be homogeneous. With a stirring mixer installed in each of a plurality of the thickener tanks, since a thickener solution of a homogeneous viscosity can always be injected to the soybean milk even when a thickener tank is switched to another one, the quality of frozen bean curd can be maintained constantly.

An embodiment of the present invention will be described with reference to drawings hereinafter.

FIG. 1 is a system diagram of a continuous production apparatus of bean curd of the present invention.

The continuous production apparatus essentially comprises a pipeline (transportation line) 10, a thickener injecting section 20 attached to the pipeline 10, a solidifying agent injecting section 30 attached to the pipeline 10, and a maturing conveyor (maturing section) 40 arranged at the trailing end of the pipeline 10. The thickener injecting section 20 comprises two thickener injecting units 20e, 20f. The solidifying agent injecting section 30 comprises a solidifying agent injecting unit 30a.

The starting end of the pipeline 10 is connected to the soybean milk tank 11 and the trailing end of the pipeline 10 is arranged at the upstream end of the maturing conveyor 40. The pipeline 10 is provided with a pump 12, nozzle units (inflow nozzle mechanism) 21e, 21f for the thickener injecting units 20e, 20f, a stirring section 13, a nozzle unit 31 for the solidifying agent injecting unit 30a, a stirring section 14, and a switching valve 15 from the upstream side to the downstream side.

As examples of the stirring sections 13, 14, a configuration comprising a baffle plate for forming a labyrinth in the flowing direction of a fluid, and a configuration comprising a baffle plate for forming a helix in the flowing direction of a fluid are presented. According to the configurations of the stirring sections 13, 14, a fluid passing through the inside of the pipeline 10 can be mixed homogeneously.

The thickener injecting units 20e, 20f are connected to the pipeline 10 at thickener tanks 23ex, 23ey, 23fx, 23fy via the pumps 22e, 22f and the nozzle units 21e, 21f, respectively. Each of the thickener tanks 23ex, 23ey, 23fx, 23fy comprise a built-in stirring mixer 25, which is driven and rotated by a motor M. Switching valves 24ex, 24ey, & 24fx, 24fy are provided between the thickener tanks 23ex, 23ey, & 23fx, 23fy and the pumps 22e & 22f respectively.

The thickener tanks 23ex, 23ey, 23fx, 23fy accommodate a thickener $T_1$ or a thickener $T_2$, of a predetermined concentration, corresponding to the thickener injecting unit 20e or 20f.

Figure 2:
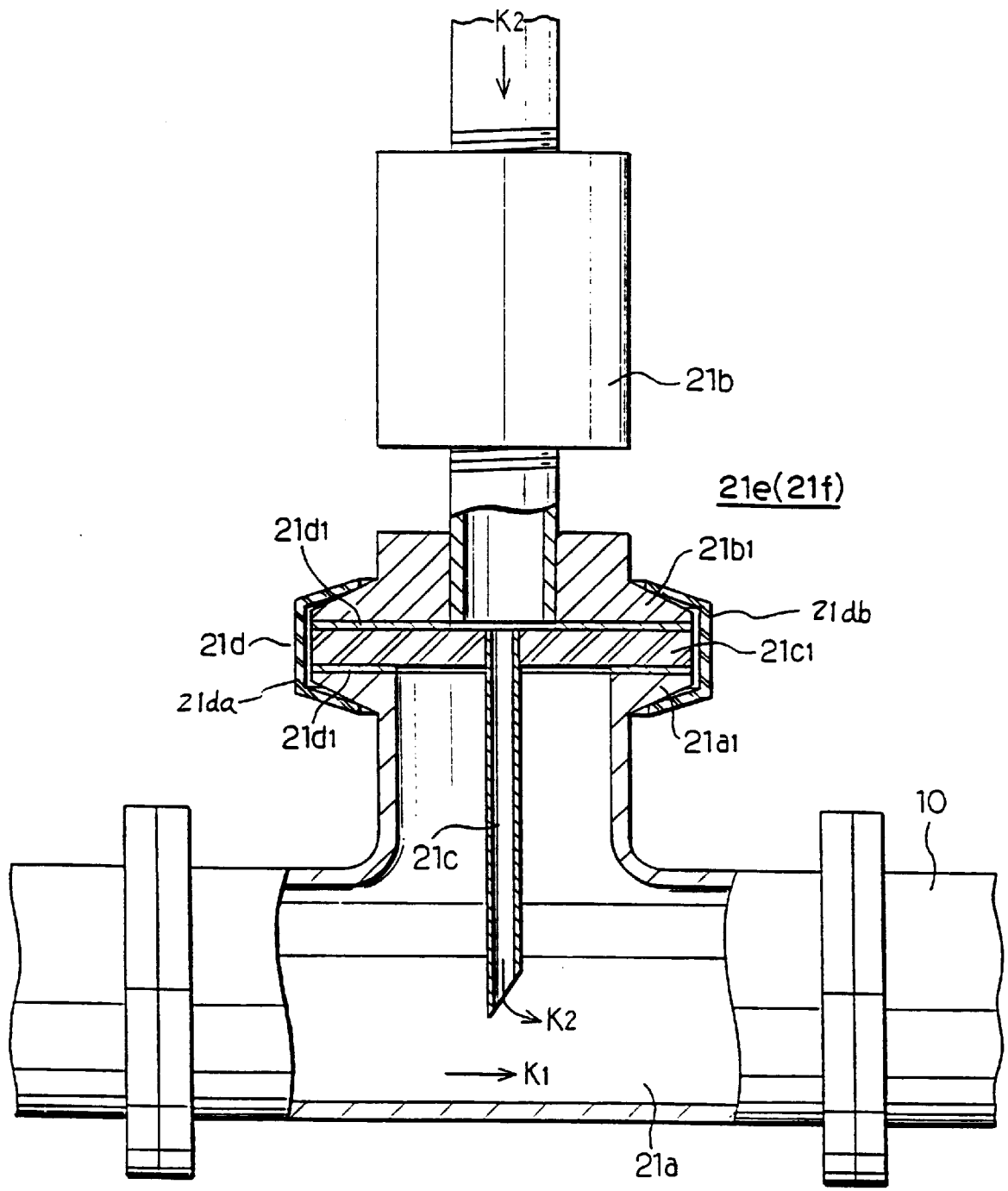
FIG. 2 is a partially broken and cross-sectional enlarged view of the nozzle unit of the continuous production apparatus of FIG. 1.

FIG. 2 is a partially broken and cross-sectional view of the nozzle unit 21e, which is connected to the pipeline 10. The nozzle unit 21f has the same configuration as the nozzle unit 21e.

The nozzle unit 21e comprises a housing 21a, an injecting nozzle 21c, a solenoid valve 21b and a clamp 21d. The housing 21a, which has T-shape, is indirectly connected to the pipeline 10. The injecting nozzle 21c is connected to the pipe leading to the pump 22e via the solenoid valve 21b, and is also accommodated in the housing 21a. A flange $21a_1$ with an oblique lower surface is formed at the branching point of the housing 21a. A flange $21b_1$ with an oblique upper surface is attached to the short tube of the solenoid valve 21b. A flange $21c_1$, which is interposed between the flanges $21a_1$, $21b_1$ via packing $21d_1$, $21d_1$, is provided at the base of the injecting nozzle 21c. The flanges $21a_1$, $21b_1$, $21c_1$ are interlocked removably via a clamp 21d. The edge of the injecting nozzle 21c opens obliquely to the direction in which a fluid flows in from the pipeline 10 (the direction shown by the arrow $K_1$ in FIG. 2) at the center of the housing 21a.

The clamp 21d comprises a pair of arms and screws (not illustrated). The arms 21da, 21db, each has a semi-circular shape when viewed from the above, are interlocked at the corner portions and arranged with a space. The space (diameter) formed by the arms can be opened or closed by the above-mentioned screws. As shown in FIG. 2, the arms have a groove-like shape in the cross-section so as to engage with the oblique surface of the flanges $21a_1$, $21b_1$ at the same time. By wringing the diameter of the arms (by having the space between the arms narrower), the flange $21a_1$ and the flange $21b_1$ are held closely to interpose the flange $21c_1$. Accordingly, the flanges $21a_1, 21b_1, 21c_1$ are interlocked to fix the injecting nozzle $21c$ attached to the flange $21c_1$. On the other hand, by loosening the diameter of the arms, the flanges $21a_1, 21b_1, 21c_1$ are separated to remove the injecting nozzle $21c$ attached to the flange $21c_1$ from the housing $21a$.

As can be seen from FIGS. 1 and 2, the thickener injecting unit $20e$ can continuously inject the thickener $T_1$ from either the thickener tank $23ex$ or the thickener tank $23ey$ to the pipeline 10 via the solenoid valve $21b$ and the injecting nozzle $21c$ of the nozzle unit $21e$ by opening either one of the switching valves $24ex, 24ey$ and operating the pump $22e$ (see the arrow $K_2$ shown in FIG. 2). Similarly, the thickener injecting unit $20f$ can continuously inject the thickener $T_2$ from either the thickener tank $23fx$ or the thickener tank $23fy$ to the pipeline 10.

The switching valves $24ex, 24ey$ (or the switching valves $24fx, 24fy$) can switch the thickener tanks $23ex, 23ey$ (or the thickener tanks $23fx, 23fy$) during the operation. The solenoid valve $21b$ can securely stop the thickener $T_1$ (or the thickener $T_2$) from the pump $22e$ (or the pump $22f$), or inject to the pipeline 10.

The solidifying agent injecting unit $30a$ is connected to the pipeline 10 at the solidifying agent tank 33 via the pump 32 and the nozzle unit 31. The nozzle unit 31 has the same configuration as the nozzle unit $21e$ shown in FIG. 2. That is, a housing is indirectly connected to the pipeline 10. And a solenoid valve and an injecting nozzle are interlocked removaly to the housing via a clamp.

The solidifying agent tank 33 of the solidifying agent injecting unit $30a$ accommodates a solidifying agent C of a predetermined concentration, which can be continuously injected to the pipeline 10 via the nozzle unit 31 by operating the pump 32.

The maturing conveyor 40 comprises a driving roller 41, a guide roller 42, and a conveyor belt 43 would around thereto. A pair of guiding plates 44, 44 are provided at the both sides of the longitudinal direction of the conveyor belt 43 (FIG. 1 shows only one of the guide plates 44). The guiding plates 44, 44 are interlocked via a partition plate $44a$ at the upstream end of the conveyor belt 43. A steam unit 46 with a lid is provided above the conveyor belt 43. The maturing conveyor 40 can drive the conveyor belt 43 in the direction of the arrow $K_3$ (see FIG. 1) by operating the driving roller 41.

The operation of the continuous production apparatus will be described.

Soybean milk S is accommodated in the soybean milk tank 11 and continuously conveyed therefrom by the pipeline 10 by operating the pump 12 and opening the switching valve 15. At the time, one thickener injecting unit $20e$ continuously inject the thickener $T_1$ to the soybean milk S via the nozzle unit $21e$, and the other thickener injecting unit $20f$ also continuously inject the thickener $T_2$ to the soybean milk S via the nozzle unit $21f$. The injection of a thickener can be either one of the thickener $T_1$ or the thickener $T_2$.

Furthermore, the solidifying agent injecting unit $30a$ continuously injects the solidifying agent C to the soybean milk S via the nozzle unit 31.

Accordingly, the soybean milk S, to which the thickeners $T_1, T_2$, and the solidifying agent C are continuously injected while being conveyed in the pipeline 10, is continuously putted into the maturing conveyor 40 after homogeneously mixed by the stirring sections 13, 14.

By having the conveyance time in the pipeline 10 from the nozzle unit $21e$ on the upstream side to the maturing conveyor 40 sufficiently short, even if the soybean milk S in the soybean milk tank 11 has a high temperature of 70 to 95° C. and a thickener is added thereto without lowering the temperature, a soybean milk of a sufficiently homogeneous quality can be provided to the maturing conveyor 40 so that the effect of viscosity rise of the thickeners $T_1$ and $T_2$ can be suppressed to a negligible degree.

On the maturing conveyor 40, by driving the conveyor belt 43 and operating the steam unit 46, the soybean milk introduced from the pipeline 10 is conveyed while heated to about 70 to 95° C. so as to be matured and solidified continuously. Then the product is discharged from the downstream side as bean curd (before freezing).

The bean curd before freezing, which is discharged from the maturing conveyor 40, then passes through a water tank for eliminating the solidifying agent C as well as for cooling down to a cooling temperature area, cut out in a predetermined size, and applied with a cooling processing to a freezing temperature to produce frozen bean curd.

As heretofore explained, in a continuous production method of frozen bean curd of the present invention, a thickener and a solidifying agent are added continuously to soybean milk, matured and solidified continuously. Since the processes to produce bean curd from soybean milk are continuously conducted, the cooling treatment and the heating treatment of the soybean milk can be omitted, and thus advantageous effects such as reasonable heat utilization, drastic reduction of the production time, and reduction of the amount of the thickener and the solidifying agent by half can be realized.

According to a continuous production apparatus of frozen bean curd of the present invention, by the combination of a transportation line for continuously conveying the soybean milk, a thickener injecting section, a solidifying agent injecting section, and a maturing section, the above-mentioned invention of the continuous production method can be smoothly carried out.

In the above-mentioned embodiment, a level sensor for detecting the accommodated amount of the soybean milk S can be provided in the soybean milk tank 11. Similarly, a level sensor can be provided in the thickener tanks $23ex$, $23ey$, $23fx$, $23fy$, and the solidifying agent tank 33. If the stirring section 14 on the downstream side has a sufficiently high mixing ability, the stirring section 13 on the upstream side can be omitted.

Although the two thickener injecting units $20e, 20f$ are provided in the above-mentioned embodiment, the configuration is not limited thereto. A single unit or three or more units can be applied as well. Similarly, the thickener tanks $23ex, 23ef$ (or the tanks $23fx, 23fy$) attached to the thickener injecting unit $20e$ (or the injecting unit $20f$) can be provided only one, or three or more. Further, a stirring mixer can be installed in the solidifying agent tank 33 as in the above-mentioned thickener tanks $23ex, 23ey, 23fx, 23fy$ so as to prevent sedimentation of the solidifying agent C.

Although a continuous production method of frozen bean curd of the present invention and an apparatus thereof have been concretely described, the present invention is not limited to the embodiment, but may be embodied in other specific forms with modification in the scope of the spirit or essential characteristics thereof.

What is claimed is:

1. A continuous production apparatus of frozen bean curd where a thickener and a solidifying agent are added to soybean milk, matured and solidified to make bean curd before freezing, comprising:

a soybean milk tank for containing the soybean milk;

a transportation line for continuously conveying the soybean milk from the soybean milk tank;

a thickener injecting section attached to the transportation line;

a solidifying agent injecting section attached to the transportation line; and a maturing section arranged at the trailing end of the transportation line for continuously maturing and solidifying the soybean milk supplied from the transportation line.

2. The continuous production apparatus of frozen bean curd according to claim 1, wherein the transportation line includes a pipeline and the maturing section includes a conveyor.

3. The continuous production apparatus of frozen bean curd according to claim 2, further comprising a stirring section provided in the pipeline at the downstream side of the thickener injecting section and at the downstream side of the solidifying agent injecting section, respectively.

4. The continuous production apparatus of frozen bean curd according to any of claims 1 to 3, wherein the thickener injecting section includes one or plural thickener injecting units, and the thickener injecting units includes a thickener tank, a pump and an inflow nozzle mechanism to the transportation line.

5. The continuous production apparatus of frozen bean curd according to claim 4, wherein the thickener injecting unit includes a plurality of switchable thickener tanks for supplying the same thickener.

6. The continuous production apparatus of frozen bean curd according to claim 4, wherein a stirring mixer is installed in the thickener tank of the thickener injecting section.

* * * * *